United States Patent [19]

Foster et al.

[11] Patent Number: 5,383,424
[45] Date of Patent: Jan. 24, 1995

[54] METHOD AND APPARATUS FOR INCREASING THE QUANTITY AND IMPROVING THE QUALITY OF HATCHLINGS INCUBATED AND HATCHED UNDER ARTIFICIAL CONDITIONS BY EXPOSING THE EGGS TO NATURAL SOUNDS

[75] Inventors: Matthew R. Foster, Cambridge; Bruce Greenlees, Dundas; Ian J. H. Duncan, Guelph, all of Canada

[73] Assignee: The Marmon Corporation of Canada, Ltd., Canada

[21] Appl. No.: 97,742

[22] Filed: Jul. 27, 1993

Related U.S. Application Data

[62] Division of Ser. No. 991,683, Dec. 16, 1992, Pat. No. 5,251,574.

[51] Int. Cl.6 .............................................. A01K 29/00
[52] U.S. Cl. ................................................... 119/174
[58] Field of Search ................... 119/174, 6.8; 446/302

[56] References Cited

U.S. PATENT DOCUMENTS

| | | | |
|---|---|---|---|
| 4,046,973 | 9/1977 | Sato | 179/100.11 |
| 4,450,495 | 5/1984 | Naruki | 360/137 |
| 4,531,168 | 7/1985 | Suzuki | 360/96.1 |
| 4,764,961 | 8/1988 | Hung | 381/24 |
| 4,870,515 | 9/1989 | Stokes | 360/72.2 |
| 4,949,327 | 8/1990 | Forsse et al. | 446/302 X |
| 5,184,971 | 2/1993 | Williams | 446/302 X |

Primary Examiner—Gene Mancene
Assistant Examiner—Thomas Price
Attorney, Agent, or Firm—Jon Carl Gealow; Robert J. Schneider

[57] ABSTRACT

A method and apparatus for exposed eggs and hatchlings of precocial avian species incubated, hatched, and brooded under artificial conditions to sound recordings made under natural incubating, hatching and brooding conditions to reduce the spread of time over which the hatchlings emerge from the eggs, to reduce the stress experienced by both the unhatched embryo and the hatchling, and to increase the attraction of artificially incubated hatchlings to feed and water during the brooding stage.

1 Claim, 5 Drawing Sheets

METHOD AND APPARATUS FOR INCREASING THE QUANTITY AND IMPROVING THE QUALITY OF HATCHLINGS INCUBATED AND HATCHED UNDER ARTIFICIAL CONDITIONS BY EXPOSING THE EGGS TO NATURAL SOUNDS

This application is a division of copending U.S. application Ser. No. 07/991,683, filed Dec. 16, 1992 now U.S. Pat. No. 5,251,574.

BACKGROUND OF THE INVENTION

I. Field of the Invention

This invention relates to the incubation and hatching of eggs under artificial conditions such as exist in commercial incubators and hatchers. More particularly, it relates to the artificial incubation and hatching of eggs in incubators and hatchers wherein a very large number of eggs are placed in the incubator at the same time for incubation and all hatchlings are removed from the hatcher at the same time. The hatchlings are removed from the hatcher at the expiration of an optimal incubation period. The optimum incubation period is presumed to expire after that period of time when most of the eggs have hatched, and beyond which period of time further delay in the removal of the hatchlings to permit hatching of the remaining eggs would result in keeping hatchlings in the hatcher beyond a period of time they can endure, such that they will suffer dehydration, stress or possibly death before their removal.

II. Description of Related Art Including Information Disclosed under Sections 1.97 and 1.98

As previously set forth, in commercial incubators of the type wherein a large number of eggs are placed on a tray and a large number of trays are placed on a rack which is in turn placed in an incubator and then in a hatcher, it is desirable to remove the rack from the hatcher after the expiration of an optimal incubation period. As previously set forth, not all eggs will hatch precisely at or close to the expiration of the optimal hatching period. However, if the removal is delayed, the early hatchlings are subjected to stresses of dehydration by being kept in the confines of the hatching tray for extended periods of time. It not being normally profitable to return eggs which have not yet hatched to the hatcher, those eggs are destroyed with a resultant loss not only of the potential chicks, but also of the profitable use of the space occupied by those eggs in the incubator and hatcher during the incubation period.

It has been found that the incubation periods for individual eggs undergoing artificial incubation exhibit greater variability than do the incubation periods for eggs hatched by an incubating maternal hen. Further, it has been noted that artificially incubated hatchlings are slower to partake of feed and water than are hatchlings incubated and cared for by a maternal hen.

With respect to the commercial artificial incubation and hatching of eggs, the optimum conditions of temperature and humidity have been established and they can now be controlled very precisely in commercial artificial incubators. See U.S. Pat. No. 4,706,608 issued Nov. 17, 1987 for an example of a commercial incubator, see U.S. Pat. No. 5,005,523 issued on Apr. 9, 1991 for an example of such a commercial hatcher. Nevertheless, hatchability under commercial conditions is still well below 100% of the fertile eggs placed in the incubator.

It is known that embryo precocial avian species (precocial refers to species which are born mobile and venture away from the nest as soon as they are born), such as domesticated poultry species, produce a wide variety of sounds toward the end of their incubation period. These sounds include the vocalizations that the hatchling will make as a newly hatched chick. It is also known that these sounds, in a natural situation, may affect the behavior of the incubating parent bird. There is also evidence that the embryos respond to external stimuli at this time. For example, it has been reported that the clucking sound of a brooding hen will stop a domestic chick embryo from giving distress calls and that changing the position of the egg can elicit pleasure twitters from the enclosed embryo.

There is also evidence that an embryo learns before hatching to discriminate between its parents' vocalization and the vocalization of other birds. Calls by an incubating hen pheasant have also been shown to sensitize and pre-dispose embryonic chicks for proper response to calls that they will hear after hatching. This is true for feeding and caution calls as well as other calls such as cock attraction cluck calls and alarm calls.

With respect to commercial artificial incubation, perhaps the most important interaction is that between the embryos in neighboring eggs. It has been shown that the development of embryos of Bob White quail are accelerated if the eggs are incubated for the last few days with their shells in contact with each other. The acceleration of hatching is brought about by the regular loud clicking which is known to begin in domestic fowl and quail about twelve hours before hatching. Further studies have shown the accelerating effects can be produced artificially.

SUMMARY OF THE INVENTION

Accordingly, it is an object of this invention to alter the incubation period of eggs undergoing artificial incubation so as to reduce the spread in time over which the hatchlings emerge from the eggs. It is a further object of the invention to reduce the stress experienced by both the unhatched embryo and by the hatchling. Another object of the invention is to increase the attraction of artificially incubated hatchlings to feed and water during the brooding stage.

In accordance with this invention, artificially incubating eggs are exposed to sounds which are the same as those to which naturally incubating eggs are exposed. More particularly, these sounds include; The vocalizations of the incubating maternal hen, during both the incubation and brooding periods; The sounds resulting from movement of the incubating maternal hen; The vocalization of the unhatched chick; The sounds resulting from the vocalizations of both the incubating hen and of the unhatched chick in response to each other; The sounds made by the unhatched chick as it moves within the confines of its shell and as it pips the shell.

In accordance with this invention, recordings are made of those sounds to which an incubating chick and a post-hatched brooding chick are exposed under natural incubating, hatching and brooding conditions. More particularly, the sounds relate to particular time periods within the incubating, hatching and brooding cycles. The recorded sounds are reproduced within an incubator or hatcher in correlation with particular time periods during the incubating, hatching or brooding cycles.

DETAILED DESCRIPTION OF THE PREFERRED EMBODIMENTS

Figure 1:
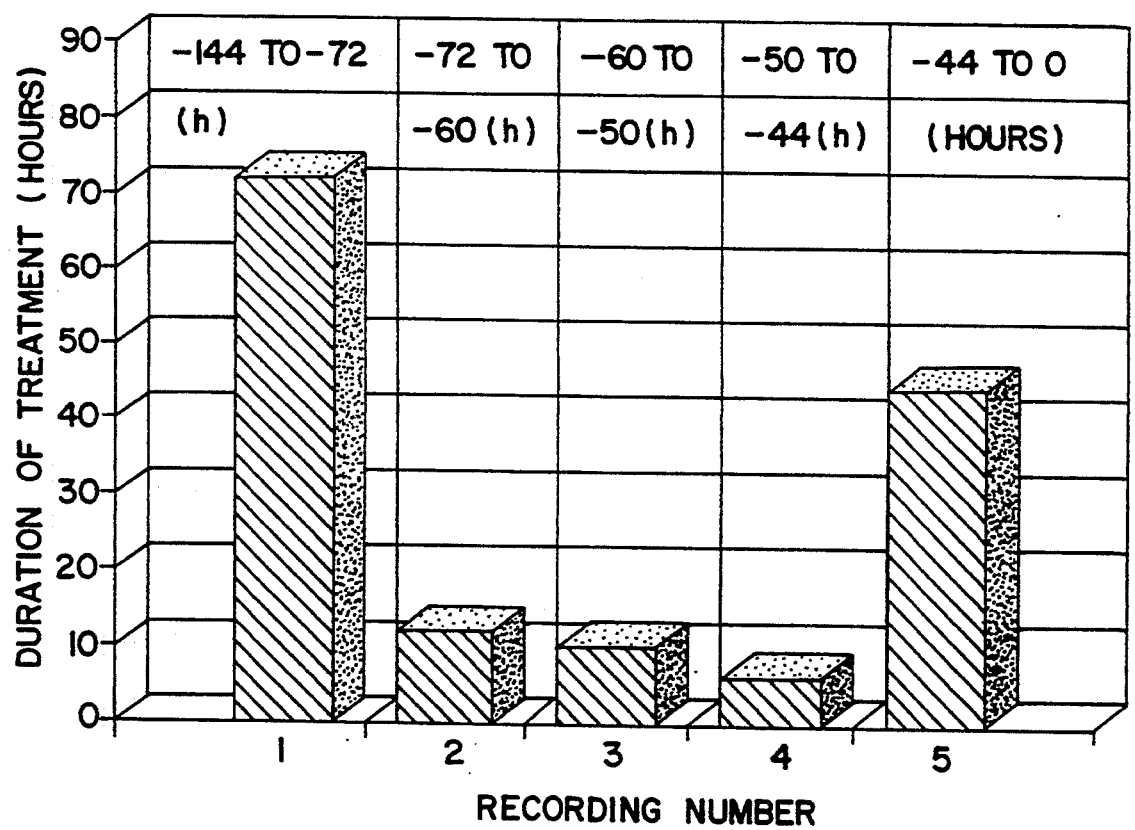
FIG. 1 is a time graph showing when the sound recording in accordance with this invention are used.

It is common knowledge in the commercial poultry industry that all fertile eggs do not hatch. Breaking of unhatched eggs is a common practice in the commercial poultry industry for the purpose of identifying the reasons for an embryo being left in the shell after the expiration of the normal incubation period. Many of the reasons for the embryo not breaking out are obvious to a trained observer. However, there are always some chicks left within the shells which are lost when the hatchlings are removed from the hatcher. There are also some hatchlings which come out of the shell well in advance of the others and subsequently die from dehydration or stress since they must wait in the hatcher until the scheduled removal of the hatchlings from the hatcher. With natural incubation, this phenomenon is not so evident. A hen will lay a clutch of eggs over many days and yet the majority of the eggs hatch within a relatively short period of time.

Researchers have known for some time that clicking sounds generated by an embryo within an egg communicates a message to adjoining eggs. The frequency of this clicking changes as the actual hatching time is approached. Researchers have attempted to use this phenomenon in laboratories to synchronize the hatching of some fowl, notably quail. Apparently there has been little success in affecting the hatch results of domestic fowl using this process alone.

In accordance with this invention, it has been found that the best results are obtained when all of the sounds related to natural incubation and hatching are recorded and then reproduced at the appropriate time in the incubator or hatcher. The incubation, hatching and brooding sounds are recorded from a nest in a suitably isolated location conducive to natural, undisturbed incubation, hatching and brooding by a maternal hen. All sounds are recorded which are produced by the hen and which can be detected and recorded from a space in the nest or above the nest. With respect to domestic chickens, the sounds are primarily recorded over the final seven days of incubation and hatching. In accordance with a preferred embodiment of this invention, the recorded sounds are separated into six recordings as follows:

Recording 1

Incorporates all vocalization and sounds that an incubating maternal hen makes during the period of 144 hours to 72 hours prior to completion of the hatch.

Recording 2

Incorporates all vocalizations, some beak-clapping, and other sounds that an incubating maternal hen makes, along with the few vocalizations made by the embryos during the period of 72 hours to 60 hours prior to completion of the hatch.

Recording 3

Incorporates all vocalizations that an incubating maternal hen makes, which are considerably less than in the prior recording, more beak-clapping, and include sounds of the hen standing up and turning the eggs more frequently along with increased vocalizations made by the embryos during the period of 60 hours to 50 hours prior to completion of the hatch.

Recording 4

Incorporates considerable vocal activity from the embryos most of which have pipped, and faint clicking, and includes very few vocalizations from the incubating hen and some beak-clapping during the period of 50 hours to 44 hours prior to completion of the hatch.

Recording 5

Incorporates hatching sounds; that is, the sounds of the embryo cutting around the shell and the different vocalizations that the embryos make during the period of 44 hours prior to completion of the hatch through the removal of the hatch.

Recording 6

This recording includes the sounds of the hen in the brooding stage which are distinctly different from those in the incubating maternal stage. These sounds are made after the hen has placed herself in front of the feeder and pecks at the feed while constantly giving a feeder call. This call is similar to the hen's other calls, which are indicative of its species, but is slightly higher in frequency and performed on a more continual basis.

In one of the preferred embodiments of this invention, each of the above-mentioned recordings were made on a magnetic tape of ninety (90) minute duration or compact disc of seventy five (75) minute duration. However, if it is desired to provide each of the recordings in a more compact manner, such as by digitally storing them on an EPROM, the recordings can be of considerably shorter duration. Whatever the length of the recording, the recordings are played repetitively and continuously during the periods specified above.

It has been found desirable to play the recordings repetitively and continuously since the developing embryos may otherwise become overstressed through presuming that they are in a nest which has been abandoned if there is no vocalization or other indication of the presence of an incubating hen.

As previously set forth, each of the above-mentioned recordings relating to incubation are made from a nest in a suitably isolated location conducive to natural, undisturbed incubation by an incubating maternal hen. In the case of feeding, the recording is also made in a similarly isolated location conducive to natural feed by the hatchlings as encouraged by a brooding hen. Each of the above-mentioned recordings are made during the corresponding time period in which they are used. The time periods have been selected such that it does not appear critical as to when the recording is made during the period during which it is used. These periods range from 72 hours for the first recording to only 6 hours for the fourth recording; such that the recording is only made during a representative part of the period in which it is to be used.

To establish the value of exposing eggs being incubated under artificial conditions to sound recordings in accordance with this invention, experiments were conducted wherein a quantity of eggs were randomly divided into two groups and artificially incubated. One group was placed in an incubator internally equipped with speakers for reproducing the above-mentioned recordings in the proper order and time sequence and with the desired amplification. The other, or control group, was placed in an identical incubator which was not provided with speakers for reproducing the recordings. Efforts were made to keep all conditions of the incubation environment, other than the sound, the same in both incubators, i.e., such conditions as temperature, relative humidity and egg turning. When required to perform activities inside the incubator, researchers performed identical operations in both the equipped and the control incubators for identical periods of time. At the appropriate time, the eggs were transferred from the incubators to hatchers. Again, the hatchers were identical except for one being provided with speakers for reproducing the appropriate recordings in the proper sequence and with the desired amplification. Again, when required to perform activity inside the hatcher, researchers performed identical operations in both the equipped and the control hatchers for identical periods of time.

This experimental procedure allowed for determination of the degree of synchronization of hatch within each hatcher and allowed for a detailed comparison between the treated and the controlled hatches. After running the experimental procedure multiple times, three distinct variations were noted with respect to the treated hatch as compared to the control hatch as follows: (1) The hatch activity commenced later for the majority of the birds; (2) The overall hatch time (time for the hatchlings to escape the shell) was reduced; (3) The percentage of successful hatches was greater.

After each hatch a number of treated hatchlings and control hatchlings were chosen at random and their response noted to previously recorded brood hen feeding calls, alarm calls and to white noise (a neutral stimulus). Treated hatchlings, having heard maternal calls during the embryonic stage were compared to control hatchlings in terms of speed with which they approached the feeder. A speaker was placed behind a feeder through which the three stimuli were played at an amplitude considered to be acceptable. If the hatchling did not reach the feeder after eight minutes, the distance they traveled was recorded and an average speed for that distance was calculated. The results were tabulated in centimeters traveled per minute. Multiple tests were conducted at twelve hours after hatch and at thirty-six hours after hatch with times and results noted.

This procedure allowed for determination of the effects of the sound treatment of this invention imprinted on fowl during the embryonic stage as compared to those not so exposed. It is evident from the results that the sound treatment of this invention has a positive effect on hatchlings.

Figure 2:
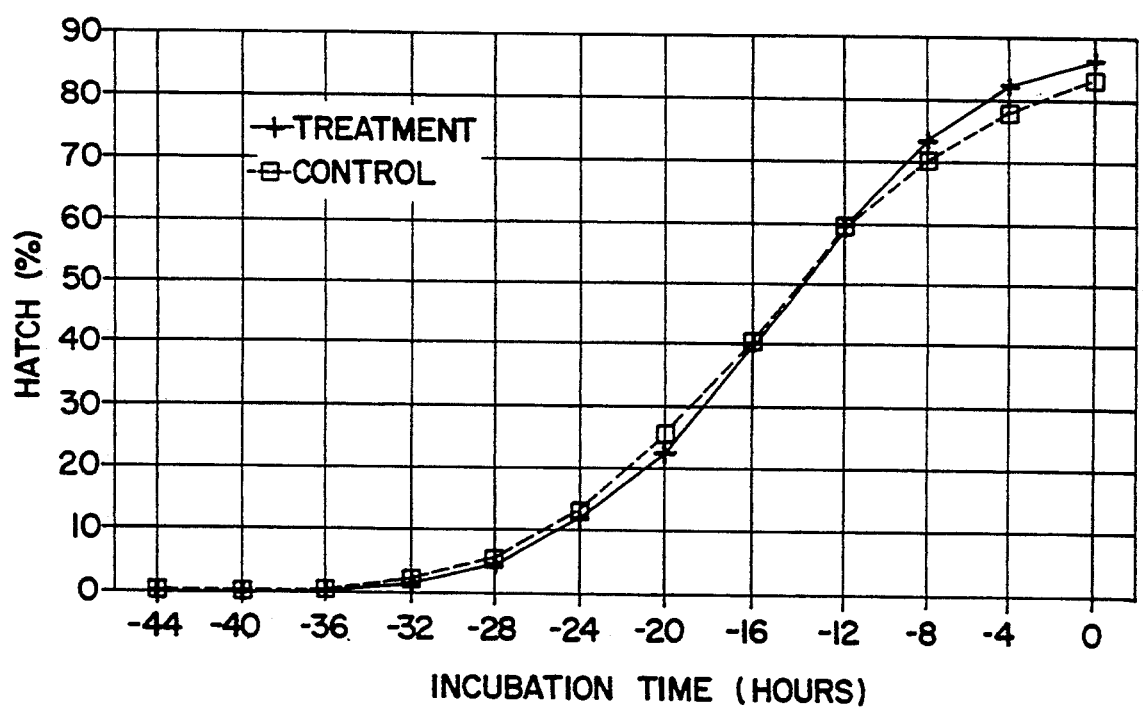
FIG. 2 is a graph illustrating the compressed hatch time and improved hatchability results from the use of sound recording in accordance with this invention.

Referring to FIG. 1, a time graph is shown setting forth when each of the above-mentioned recordings is used during the incubation and hatching periods. The last recording, Recording 6 as set forth above, is used after the chicks have hatched. FIG. 2 is a graph illustrating the compression of the hatch time and the improved hatchability, that is the greater percentage of eggs which successfully hatch. The dashed line is for the control group while the solid line is for the group exposed to sound recording treatment in accordance with this invention.

Yet another example of the effectiveness of the sound treatment system of this invention is its ability to hasten the movement of newly hatched chicks to food. Often hatchlings will not respond to feeding after artificial incubation, seemingly avoiding the feed trough. This has been particularly observed with respect to turkey poults. When exposed to the sound treatment system of this invention, the hatchlings exhibited a much better response to feeding.

Figure 3:
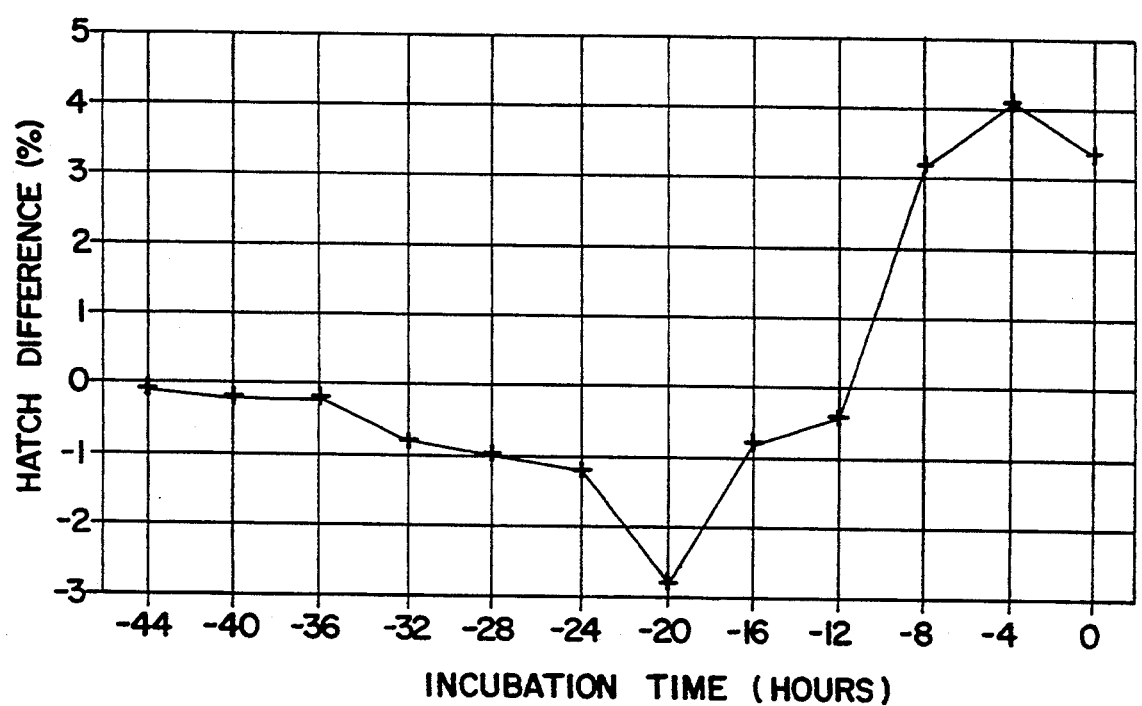
FIG. 3 is a graph showing the percentage difference with respect to incubation time of eggs incubated and hatched under artificial incubating and hatching conditions with and without the use of sound recording in accordance with this invention.

FIG. 3 is a graph showing the percentage difference with respect to incubation time of eggs incubated and hatched under artificial incubating and hatching conditions with and without the use of the sound recording treatment in accordance with this invention. It should be noted that the desired result of fewer eggs hatching considerably earlier than the desired hatching time and more eggs hatching closer to the desired hatching time results from the use of the sound recordings in accordance with this invention.

Figure 4:
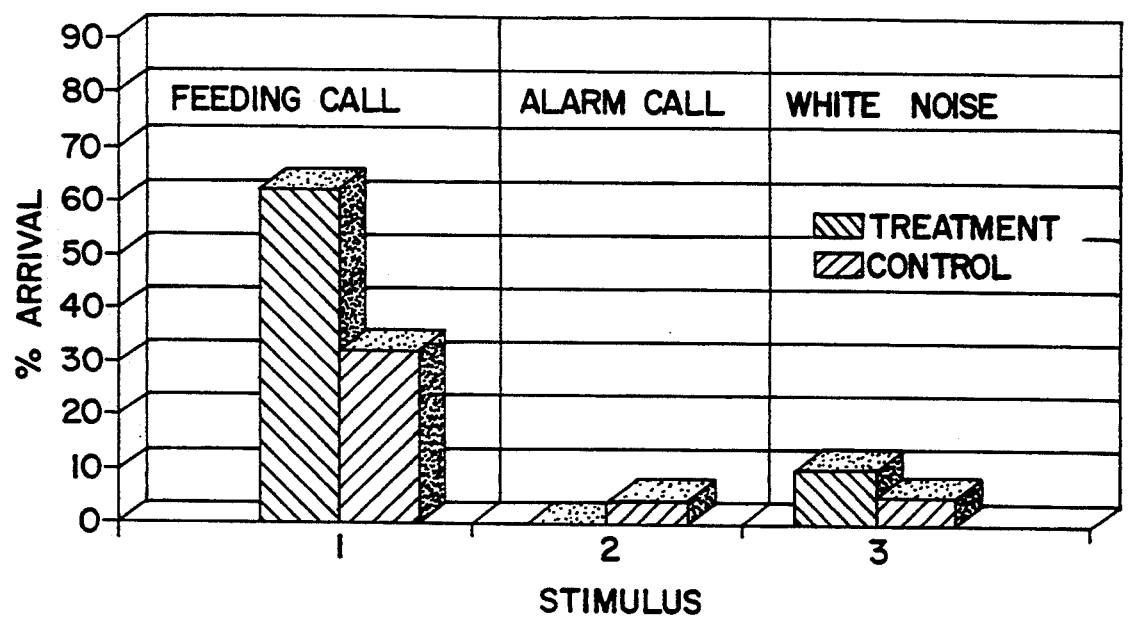
FIG. 4 is a graph showing the effect of using sound recording in accordance with this invention on the time of arrival at a feeder of hatchlings when exposed to either feeding or alarm calls or white noise.

Referring to the graph of FIG. 4, it will be seen that a greater percentage of the hatchlings will arrive at the feeder within eight minutes when exposed to a feeding call if they have been previously exposed to sound recordings in accordance with this invention. The graph also shows that the hatchlings exposed to the sound recordings of this invention prior to hatching respond as expected to an alarm call. That is, by arriving at the feeder in fewer numbers than hatchlings which were not exposed to the recordings in accordance with this invention.

The graph also shows that when exposed to white noise, a greater percentage of hatchlings exposed to the recording in accordance with this invention will arrive at the feeder within eight minutes than those hatchlings which were not exposed to the sound treatment of this invention.

Figure 5:
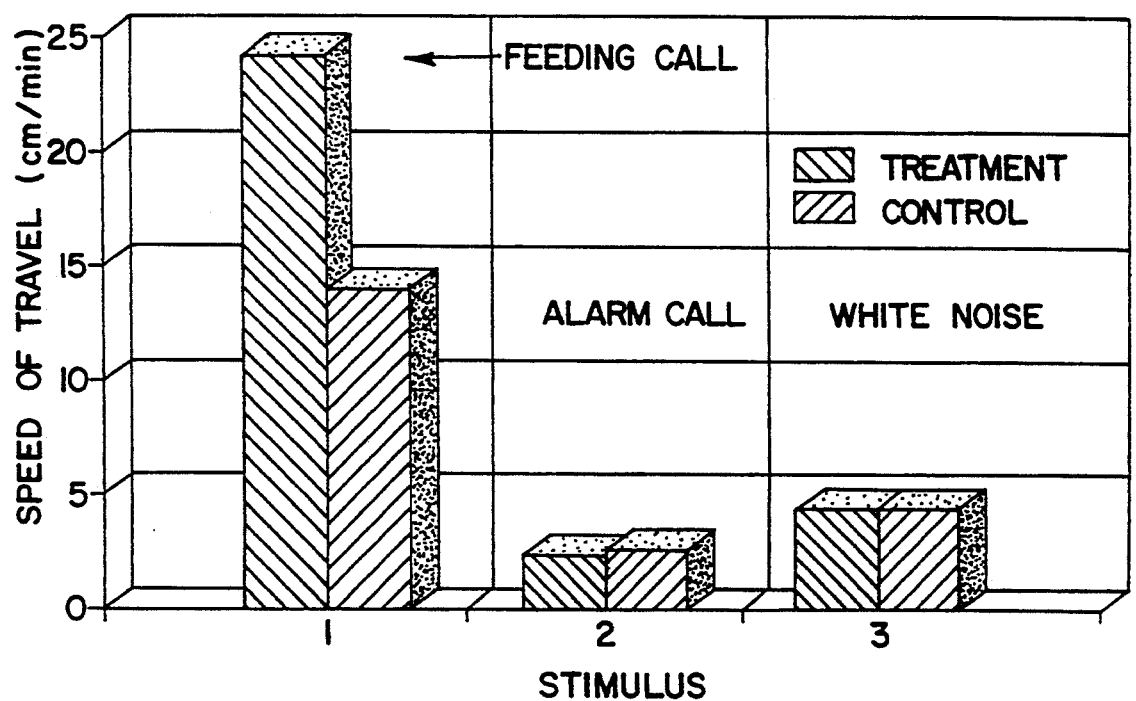
FIG. 5 is a graph showing the effect of using sound recording in accordance with this invention on hatchlings speed of travel to a feeder when exposed to either feeding or alarm calls or white noise.

Similarly, FIG. 5 shows that the speed of travel of hatchlings to the feeder in response to a feeding call is greater for those hatchlings exposed to the sound treatment in accordance with this invention than those which were not. It is also seen that exposure to an alarm, as compared to a feeding call, results in a slower speed of travel to the feeder for both the treated and untreated hatchlings. However, the hatchlings exposed to the sound treatment have an even slower speed of travel, indicated a learned behavior to an alarm call. As shown by the graph of FIG. 5, exposure of the hatchlings to white noise does not appear to significantly affect the speed of travel.

Another source of chick mortality is their inability to be socially accepted by their peers. Another benefit of the sound treatment system of this invention is that the artificially induced "mothering" sounds will mean that all the chicks will be imprinted with the same "environmental parentage." While their genealogical parents are different, having the same environmental parentage appears to reduce pecking order problems.

Other advantages of the sound treatment method and apparatus of this invention have also been observed. For instance, when eggs were transferred from the incubator to hatching baskets on the eighteenth day, an obvious difference in the position of the embryos which had received the sound treatment was noticed. While embryos which had not received the sound treatment would be observed with their beaks breaking into the air cell or at least in a position to do so, those receiving the sound treatment remained lower in their shell.

After eggs incubated with the sound treatment were transferred to hatchers, it was noted that the volume of cold water used to cool the inside of the hatching cabinet was greatly reduced for those eggs receiving the sound treatment, an indication of reduced heat output from the embryos. Further, periodic readings of the carbon dioxide level in the cabinets revealed a lower level of $CO_2$ in the cabinets containing the sound treated eggs than in those not so treated, another indication of a reduced embryo metabolic rate.

An inspection of the shells following the hatch revealed that the shell remaining from hatchlings receiving sound treatment were thinner than those not receiving the sound treatment. This appears to be an indication that the embryos receiving the sound treatment had used more of the calcium in the shell for bone construction. Again, a desired result of the sound treatment method and apparatus of this invention.

Summarizing, with respect to eggs placed in incubators and hatchers without the sound treatment of this invention, earlier movement into the air cell, the greater $CO_2$ and heat output would indicate a stress situation brought on by the embryo not having communications from or with a maternal hen. Finally, in most instances, it was noted that incubated eggs receiving the sound treatment demonstrated a higher hatch rate, a much lower cull rate, that is, fewer low quality birds, and a higher pipped ratio.

While the sound treatment method and apparatus of this invention have been described with respect to domestic chickens, it is equally applicable to the embryos of other precocial avian species. As described for chickens, the recording is utilized during the last 144 hours of the 21 day incubation and hatching period which is typical for chickens. For other species such as turkey which typically have a 28 day incubation and hatching period or even ostriches which typically have a 42 day incubation and hatching period, the sound treatments of this invention would be applied during corresponding periods measured from the expected completion of the hatch. The recording would be made under the same conditions as set forth above, with a maternal hen of the appropriate species.

It should be apparent to those skilled in the art that what has been described is considered at present to be a preferred embodiment of the system and method of this invention. In accordance with the patent statutes, changes may be made in the method as shown and described without actually departing from the true spirit and scope of this invention.

The appended claims are intended to cover all such changes and modifications which fall within the true spirit and scope of this invention.

We claim:

1. An apparatus improving the yield of hatchlings from eggs incubated and hatched under artificial conditions comprising:

A. a bird nest in a suitably isolated location which is conducive to natural, undisturbed incubation, hatching and brooding by a maternal hen, B. a recorder for recording sounds, C. microphone means located in or above said nest for receiving for recording by said recorder all sounds produced by the hen, during the incubation, hatching and brooding by said maternal hen, D. recorder control means for causing said recorder to record during portions of two or more periods during said incubation, hatching and brooding by said maternal hen, E. playback means for playing back said recordings made by said recorder, F. playback control means for causing said playback means to playback said recording during portions of two or more periods during said incubation, hatching and brooding by said maternal hen during said entire corresponding periods for eggs incubating and hatching under artificial conditions, and G. speaker means coupled to said playback means for reproducing said recorded sounds such that said eggs incubating and hatching under artificial conditions are exposed thereto, whereby the spread of time over which the hatchling emerge from eggs incubated and hatched under artificial conditions is reduced as is the stress experienced by both the unhatched embryos and by the hatchlings.

* * * * *